United States Patent

[11] 3,627,722

| [72] | Inventor | George M. Seiter<br>Golden Valley, Minn. |
|---|---|---|
| [21] | Appl. No. | 41,597 |
| [22] | Filed | May 28, 1970 |
| [45] | Patented | Dec. 14, 1971 |
| [73] | Assignee | Minnesota Mining and Manufacturing Company<br>St. Paul, Minn.<br>Continuation-in-part of application Ser. No. 746,305, , now abandoned. This application May 28, 1970, Ser. No. 41,597 |

[54] POLYURETHANE SEALANT CONTAINING TRIALKYLOXYSILANE END GROUPS
17 Claims, No Drawings

[52] U.S. Cl. .................................................. 260/37 N,
117/124 E, 260/75 NE, 260/77.5 A, 260/77.5 AM,
260/77.5 MA, 260/77.5 AP

[51] Int. Cl. ........................................................ C08g 22/08
[50] Field of Search ............................................ 260/77.5 A,
77.5 AP, 77.5 AM, 75 NA, 37 N

[56] References Cited
UNITED STATES PATENTS

| 3,246,671 | 4/1966 | Stein et al. .................... | 138/109 |
| 3,309,261 | 3/1967 | Schiller et al. ................ | 161/190 |

*Primary Examiner*—Donald E. Czaja
*Assistant Examiner*—M. J. Welsh
*Attorney*—Kinney, Alexander, Sell, Steldt & Delahunt ABSTRACT: A polyurethane sealant composition containing terminal—NCO groups, at least 5 percent of the —NCO groups being end-blocked with —Si(OR)$_3$ groups, where R is a lower alkyl. The terminal silane groups provide adhesion retention of the sealant to substrates such as metal or glass even after prolonged water immersion.

POLYURETHANE SEALANT CONTAINING TRIALKYLOXYSILANE END GROUPS

This application is a continuation-in-part of my copending application Ser. No. 746,305, filed July 22, 1968, and now abandoned which in turn is a continuation-in-part of Ser. No. 480,138, filed Aug. 16, 1965 and now abandoned.

This invention relates to improved polyurethane materials useful as adhesives, coatings and sealants which provide moisture-resistant bonds. More specifically it relates to such materials which have exceptional adherence to siliceous and metallic substrates.

It has been proposed to use various silicones or silanes as primers for adhesives applied to substrates such as glass; see for example, Muller et al. U.S. Pat. No. 3,032,439, issued May 1, 1962. Such compositions have also been used as integral blend additives for sealants. Known polyurethane sealant compositions, even when primed, fail adhesively after relatively short periods of water immersion.

The present invention has provided an adhesive or sealant which rapidly achieves high-bond strength to unprimed substrates and which forms bonds having exceptional durability after prolonged water immersion. These results are obtained by providing an elastomeric polyurethane sealant material having silane groups thereon. These silane groups are present at the ends of the polyurethane polymer chains. It is theorized that the $-Si(OCH_3)_3$ groups at the ends of the polymer chains hydrolyze on the surface to which the sealant is applied to form $-Si(OH)_3$ and that possibly a condensation takes place, e.g. with SiOH in a siliceous substrate or with a metal oxide in a metal substrate to form a permanent chemical bond. Although the exact adhesive mechanism is unknown, the bonds to nonporous substrates produced by the sealants of the present invention provide hitherto unobtainable permanency.

The sealants of the present invention have exceptional utility in such applications as automotive windshield sealants, bath tub caulkings, window glazing, and potentially as a general construction sealant. The sealants are curable at room temperature and in the absence of additives are normally honeylike liquids. It is preferred for many sealing or caulking applications to fill these liquids with an ingredient such as talc to form thixotrope for caulk gun or spatula application. The sealants cure to form a tough, rubbery product either by interaction with moisture in the atmosphere or reaction with other curing agents containing two or more active hydrogen atoms.

In formulating adhesives, additives such as tackifying resins and stabilizers are included depending on the use for which the adhesive is intended. Crosslinking agents can be incorporated and by varying the amounts of the same, the properties of the final cured product can be varied from a soft rubber to relatively hard rubbers.

The preferred embodiments of the invention involve the formation of a polyurethane prepolymer by reacting a diisocyanate with compounds having two or more active hydrogens. By "active hydrogens," as the term is used herein, is meant hydrogens which display activity according to the Zerwitinoff test described in J.A.C.S. 49, 3181 (1927). Typical groups containing reactive hydrogen are hydroxyl, carboxyl, primary amino and secondary amino groups.

An excess of isocyanate should be present so that the prepolymer is an NCO terminated material. The ratio of NCO groups to active hydrogens is preferably between about 1.4:1 to about 3:1 for moisture curing, one-part sealants. The —NCO/—OH ratio can be as low as about 1.05:1 for diisocyanate/diol prepolymers and can be as high as 6 in the case of two-part sealants in which an isocyanate adduct forms one part and a coreactant such as a polyol or a polyamine forms the other coreactant. It has been found that the NCO terminated prepolymer can be capped or end-blocked with a silane if the silane added contains a single-active hydrogen atom, so that the silanes will not be chemically taken up into the middle of the polymer chains.

Silanes useful in the practice of the invention are those of the general formula $$HE_1-R_2-Si(OR)_3$$

where R is a lower alkyl group, preferably $CH_3$, $R_1$ is $-O-$, $-S-$, or 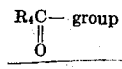

$R_2$ is an alkylene group having 2 to 18 carbon atoms, and preferably 2 to 4 carbon atoms, where $R_3$ is an organic radical free of active hydrogens, preferably an alkyl, aryl, substituted alkyl, substituted aryl, or

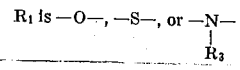 group where $R_4$ is an alkyl, aryl, substituted alkyl or substituted aryl group.

$R$, $R_1$, $R_2$, $R_3$ and $R_4$ are free of active hydrogens and H is an active hydrogen.

Examples of compounds falling within this generalized formula include alkylaminoalkyltrialkoxysilanes, such as $CH_3NH(CH_2)_3Si(OCH_3)_3$ or $CH_3(CH_2)_3NH(CH_2)_3Si(OCH_3)_3$, mercaptoalkyltrialkoxysilanes, such as $HS(CH_2)_3Si(OC_2H_5)_3$ $HS(CH_2)_3Si(OCH_3)_3$, 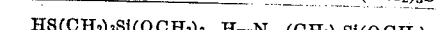

hydroxyalkyltrialkoxysilanes.

Other examples will be readily apparent to those skilled in the art.

A significant percentage of the NCO groups of the prepolymer should be end blocked with $-Si(OCH_3)_3$ radicals in order to provide strong bonds with siliceous substrates. Preferably enough silane is added to react with about 10 percent of the NCO groups. Useful results can be achieved by using enough silane to react with between about 5 and 50 percent of the NCO groups. Less than about 5 percent does not provide significant improvement in adhesive qualities, while more than about 50 percent results in a soft polymer having less cohesive strength. End blocking of up to 100 percent of the NCO groups does, however, provide polymers with sufficient cohesive strength for a variety of applications. The preferred ratio is from about 10 percent to 20 percent of equivalents of silane to isocyanate groups, superior results being obtainable in this range. In the embodiments of this invention wherein enough silane is used to react with (i.e. provide end-capping of) more than 50 percent of the NCO groups, it is particularly desirable to end-cap polyurethane prepolymers formed from arylene diisocyanates and polyoxyalkylene polyols. In a typical formulation of this type, a sealant which is about 100 percent end-blocked is made from 6 moles of polyoxypropylene glycol, 7 moles of toluene diisocyanate, and about 2 moles of a suitable secondary aminosilane. Formulations of this type can also include polyoxypropylene triols and the like.

The preferred active hydrogen containing materials for use in forming the sealants of the present invention are polyalkylene ether glycols. Such glycols may also contain triols to provide a crosslinked product. Other reactants containing active hydrogens such as diamine, —SH terminated polyethers, and hydroxyl terminated polyesters, can be used in place of or in combination with polyether diols. Active hydrogen containing polymeric materials which are preferred for making rubbery sealants and which result in products having a good balance of elasticity and cohesive strength are those which have an average molecular weight between about 400 and about 6,000. More rigid structural adhesives can be formed using lower molecular weight materials.

Various organic diisocyanates may be used in the practice of the invention. Because of their ready availability and the fact that they are liquid at room temperature, mixtures of the 2,4- and 2,6-toluene diisocyanate isomers are preferred in the practice of the invention. Other useful aromatic diisocyanates include paraphenylene diisocyanate, meta-phenylene diisocyanate, 4,4'-diphenyl diisocyanate, 1,5 naphthalene diisocyanate, 4,4'-diphenyl methane diisocyanate, 4,4'-diphenyl ether diisocyanate, 3,3' dimethyl 4,4' diphenyl diisocyanate and 3,3' dimethoxy 4,4' diphenyl diisocyanate. Suitable aliphatic diisocyanates include the simple alkyl diisocyanates such as hexamethylene diisocyanate as well as more complex materials such as bis(2-isocyanatoethyl) fumarate, bis(2-isocyanatoethyl) carbonate, bis(2-isocyanatoethyl)-4-cyclohexene-1,2-dicarboxylate, bis(2-isocyanatoethyl)1,4,5,6,7,7' hexachloro-5-norbornene-2,3-dicarboxylate.

In order to cause the polyurethane reaction mixtures of the present invention to form elastomers in a relatively short time at room temperatures, it is preferred to add a catalyst such as an organic compound or mixture of compounds of certain polyvalent metals, for example, those of tin, bismuth, antimony, lead and mercury. Examples are dibutyltin dilaurate, bismuth octoate, antimony octoate, lead octoate, lead naphthenate, mercuric acetate, phenyl mercuric hydroxide, phenyl mercuric acetate, etc.

It will be understood that rather than providing a paste containing NCO terminated material, two-part sealant systems can be used in which one part contains a diisocyanate prereacted with a portion of the hydrogen containing material and the other part contains the balance of a stoichiometric amount of hydrogen containing material sufficient to react with all of the NCO groups in the system. In such cases the lead salts of carboxylic acids and organo mercuric compounds, or combinations thereof as catalysts are preferred since these tend to catalyze the NCO—OH reaction preferentially to the NCO water reaction to provide quick bodying of the sealant. On the other hand, in the case of a moisture curable NCO terminated paste it is preferred to use a tin or other metallic salt suitable to catalyze the desired NCO water reaction.

The following reactions are believed to be involved: 1. The NCO terminated prepolymer is formed with a ratio of 2 NCO groups per active hydrogen by addition reaction an organic diisocyanate with an active hydrogen containing composition.

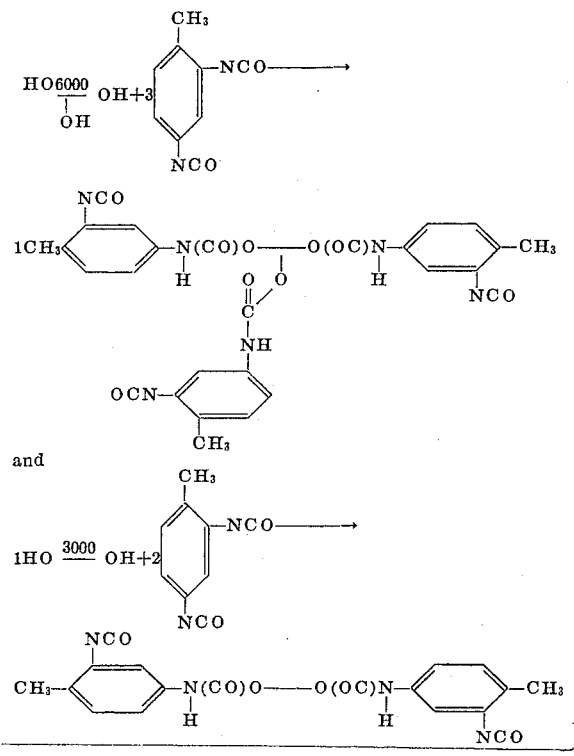

2. A silane having a single reactive hydrogen is then added:

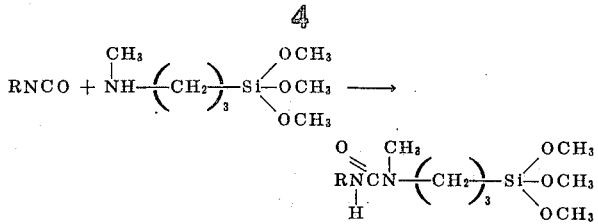

It is theorized that the siloxane is hydrolyzed on the surface to which the sealant is applied as follows:

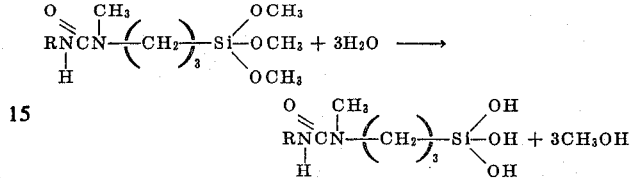

and that further, a condensation next takes place with SiOH in the case of glass to form a permanent chemical bond as follows:

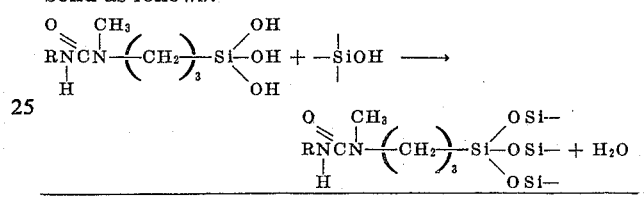

While the preferred curable materials of this invention are formed by reaction of a polyol and a polyisocyanate, it will be understood that polymeric isocyanates, such as polymethylene polyphenyl polyisocyanate (PAPI) having a similar molecular weight and functionality, can be substituted. The isocyanate terminated curable material, prepolymer or otherwise, should have an average molecular weight between about 200 and 20,000 and should have an average of about 2 to 8—NCO groups per average molecular weight.

The invention will be further understood with reference to the following examples. All parts are by weight unless otherwise specified. All compositions were cured at 75° F. and 50 percent relative humidity unless otherwise specified. The adhesion tests employed were performed in accordance with ASTM test method D903—49 "Peel or Stripping Strength of Adhesives." Immediately prior to running of the tests the substrates used in the test were cleaned with acetone until free from grease, moisture, and other impurities. The sealant specimens were cured on the cleaned substrates at 77° F. and 50 percent relative humidity until a constant hardness indicated complete cure.

EXAMPLE I

An OH terminated adduct was formed from the following ingredients:

| | Parts |
| --- | --- |
| Polyoxypropylene glycol (OH No. 38.7) | 725.0 |
| Hexamethylene Diisocyanate | 21.0 |

The ingredients were charged to the 1 liter resin reaction flask under 1 cubic foot per hour dry $N_2$ and heated with stirring to 100° C. After 4 hours at that temperature, the product was cooled to 45° C. The resultant adduct had an hydroxyl number of approximately 18.8. ("Hydroxyl number" as herein used can be defined as the mg. of KOH equivalent to the OH content of 1 gram of the sample.) The adduct was reacted further to form an NCO terminated prepolymer:

| | Parts |
| --- | --- |
| Adduct (OH No. 18.8) (equiv. wt. 2984) | 298.4 |
| Polyoxypropylene Triol (OH No. 28.9) wt. 1940) | 194.0 |
| Toluene Diisocyanate (80% 2,4/20% 2,6) | 34.8 |
| Dibutyltin Dilaurate | 0.1 |

The first three of the ingredients listed were charged to a nitrogen swept 1 liter resin reaction flask and heated with stirring to 80° C. This temperature was maintained 4 hours. The prepolymer was then cooled to 60° C. and the catalyst, dibutyltin dilaurate, added. This prepolymer had an NCO equivalent weight of approximately 2,600 and was a clear, colorless liquid with a viscosity of approximately 100 strokes.

The prepolymer was then further processed to form a sealant:

|  | Parts |
|---|---|
| Prepolymer | 100.0 |
| Rutile TiO$_2$, dry | 13.9 |
| Zinc Oxide, dry | 13.9 |
| Magnesium Silicate, dry, finely divided | 33.4 |
| Methylaminopropyltrimethoxysilane | 1.4 |

The listed ingredients excepting the methylaminopropyltrimethoxysilane were mixed in a Brabender Plastograph for 1 hour under 1 cubic foot per hour dry nitrogen. The silane was then added and reacted for 10 minutes with mixing. The product was a thixotropic paste which when exposed to moisture cured by reaction with the moisture to form a rubber, strongly adherent to glass, ceramic tile, etc. This adhesion was retained even after long term immersion under water for a period of several months.

EXAMPLE II

|  | Parts |
|---|---|
| Polyoxypropylene glycol (OH No. 36.2) | 700.0 |
| Polyoxypropylene triol (OH No. 29.7) | 850.0 |
| Toluene diisocyanate (80/20 ratio of 2,4- to 2,6-isomers) | 156.6 |
| Dibutyltin dilaurate | 1.0 |

The first three ingredients were charged to the 2 liter resin reaction flask, heated to 80° C. under dry nitrogen with stirring. After 4 hours at that temperature, product was cooled to 60° C., the dibutyltin dilaurate added, cooled to 50° C. The resulting prepolymer was then further processed to form a sealant.

|  | Parts |
|---|---|
| Prepolymer | 500.0 |
| Finely divided dry silica flour | 25.0 |
| Carbon black (dry) | 40.0 |
| ZnO (dry) | 25.0 |
| Rutile TiO$_2$ (dry) | 25.0 |
| Magnesium silicate (dry) | 370.0 |
| 2(2'-hydroxy 5' methylphenyl)benzotriazole | 5.0 |
| Methylaminopropyltrimethoxysilane | 7.0 |

All ingredients excepting the silane were mixed under dry nitrogen for 1 hour. The methylaminopropyltrimethoxysilane was then added and mixed 5 minutes. The resultant sealant, a thixotropic paste, cured when exposed to moisture in the atmosphere to a rubber with tensile strength of approximately 200 p.s.i. and ultimate elongation of 200 percent, Shore A hardness of approximately 55. As the compound cured, it developed excellent adhesion to unprimed glass. The cured compound on unprimed or untreated glass yielded a 180° peel value of 20 pounds per inch width at a peel rate of 2 inches per minute with 100 percent cohesive failure of the sealant or adhesive. This adhesion was retained even after long term immersion under water for a period of several months.

The example was repeated substituting a difunctional amino silane, gamma aminopropyltriethoxysilane, for the methylaminopropyltrimethoxysilane. The mixture "gelled" or increased in viscosity on addition of the silane, indicating the occurrence of a chain extension reaction. The resulting compound when fully cured had a tensile strength of 254 p.s.i., ultimate elongation of 200 percent and Shore A$_2$ hardness of 50. When cured on glass the sealant gave a 180° peel value of 25 pounds per inch width at a peel rate of 2 inches per minute. After 4 days water immersion the peel value was only 4 pounds per inch width at the same peel rate, with adhesive failure of the sealant from the glass.

The example is repeated except that no silane was added. The resulting sealant when fully cured had a tensile strength of 337 p.s.i. and ultimate elongation of 175 percent. When cured on glass the sealant gave a 180° peel strength of only 4 pounds per inch width at a peel rate of 2 inches per minute, failing adhesively from the glass, without water immersion.

EXAMPLE III

The prepolymer of example II was mixed with the following ingredients:

|  | Parts |
|---|---|
| Prepolymer | 500.0 |
| Finely divided dry silica flour | 25.0 |
| Carbon black (dry) | 40.0 |
| Zinc oxide (dry) | 25.0 |
| Rutile TiO$_2$ (dry) | 25.0 |
| Magnesium silicate (dry) | 370.0 |
| 2(2'-hydroxy 5' methylphenyl)benzotriazole | 5.0 |
| Mercaptoethyltrimethoxysilane | 7.0 |

The ingredients were mixed and reacted under the same conditions as set forth in example II. The resulting sealant displayed excellent adhesion to unprimed glass, had a tensile strength of 310 p.s.i. and ultimate elongation of 125 percent. After 8 days water immersion the 180° peel value on glass at a peel rate of 2 inches per minute was 17 pounds per inch width with cohesive failure of the sealant.

EXAMPLE IV

The preparation of an N-substituted aminosilane adduct was conducted as follows:

| Ingredients | Parts |
|---|---|
| Aminopropyltrimethoxysilane | 22.1 |
| Acetic anhydride | 6.27 |

The acetic anhydride was added dropwise with stirring over a 15-minute period to the aminopropyltrimethoxysilane. An exothermic reaction was noted. The following reactions are believed to have occurred, resulting in the formation of a silane adduct having a single active hydrogen $$NH_2(CH_2)_3Si(OCH_3)_3 + (CH_3CO)_2O \longrightarrow$$

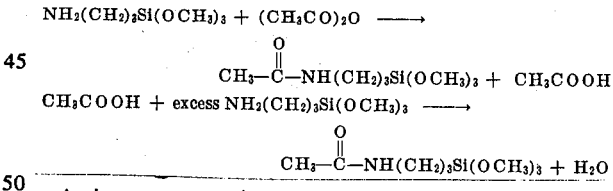

$$CH_3COOH + \text{excess } NH_2(CH_2)_3Si(OCH_3)_3 \longrightarrow$$

$$CH_3-\overset{O}{\underset{\|}{C}}-NH(CH_2)_3Si(OCH_3)_3 + H_2O$$

An isocyanate-terminated prepolymer was prepared as follows:

| Ingredients-Prepolymer | Parts |
|---|---|
| Polypropylene glycol (OH No. 41.8) | 643.3 |
| Polyether triol (OH No. 27.0) | 995.0 |
| Toluene diisocyanate (80/20 ratio of 2,4 2,6-isomers) | 166.6 |
| Dibutyl tin dilaurate | 1.5 |

The first three ingredients were charged to a reaction vessel and heated to 80° C. under dry nitrogen with stirring. After 4 hours at that temperature, the product was cooled to 60° C.; the dibutyl tin dilaurate added, and the mixture was cooled to 50° C. The resulting prepolymer, together with the above silane adduct was then further processed to form a sealant as follows:

| Ingredients-Finished Sealant | Parts |
|---|---|
| Prepolymer | 500 |
| Finely divided dry silica | 15 |
| Carbon black (dry) | 40 |
| ZnO (dry) | 25 |
| Rutile TiO (dry) | 25 |
| Magnesium silicate (dry) | 370 |
| 2(2'-hydroxy 5' methyl phenyl) benzotriazole | 5 |
| Dibutyl tin dilaurate | 1 |
| Silane adduct | 7 |

400 parts of the prepolymer and all of the other ingredients except the dibutyl tin dilaurate and silane adduct were mixed together under dry nitrogen for 30 minutes to obtain a good dispersion. The remaining 100 parts of prepolymer were then added and allowed to mix under dry nitrogen for 15 minutes. The dibutyl tin dilaurate was then charged into the batch and mixing continued for an additional 45 minutes under dry nitrogen. The silane adduct was added as a final step, and the batch was mixed for 15 minutes under dry nitrogen. The resultant sealant, a thixotropic paste, cured when exposed to atmospheric moisture, to a tough, flexible, rubber. As the compound cured, it developed excellent adhesion to unprimed glass. When a one-eighth inch thick spread of this sealant was allowed to cure for 7 days on unprimed glass at 75° F. and 50 percent relatively humidity and the resultant bond immersed in water, it retained excellent adhesion to the glass even after 1 month immersion.

EXAMPLE V

Substantially the procedure of example II was followed to provide a prepolymer from the following ingredients:

|  | Parts/Weight |
|---|---|
| Polyoxypropylene glycol (OH No. 37.4) | 300 |
| Polyoxypropylene triol (OH No. 28.1) | 400 |
| Toluene diisocyanate (80/20 ratio of 2,4-2,6-isomers) | 69.8 |
| Dibutyltin dilaurate | 0.4 |

The resultant sealant was obtained substantially as in example II and had the following composition:

| Prepolymer (above) | 996 |
|---|---|
| Pyrogenic silica (dry) | 30 |
| Carbon black (dry) | 80 |
| Rutile titanium dioxide (dry) | 50 |
| Magnesium silicate (dry) | 740 |
| Zinc oxide (dry) | 50 |
| 2(2'-hydroxy 5' methylphenyl) benzo triazole | 10 |
| Methylaminopropyltrimethoxysilane | 102 |

This sealant was approximately 100 percent end-blocked with methylamino-propyltrimethoxysilane. Its properties, after curing, were as follows:

| Tensile strength | 418 p.s.i. |
|---|---|
| Elongation | 25% |
| Rex hardness | 85 |
| Glass adhesion | Good |

EXAMPLE VI

The procedures and formulations of example V were followed, except that 76.5 instead of 102 parts of the silane were used, thus providing 75 percent end-blocking. The properties of the cured adhesive were:

| Tensile strength | 760 |
|---|---|
| Elongation | 35 |
| Rex hardness | 80 |
| Glass adhesion | Good |

Although the properties of the adhesive of examples V and VI are adequate for many uses, the tear resistance of the cured polymer is substantially less than that of cured adhesives made according to this invention with less silane end-blocking. This is particularly true in the case of the 100 percent end-blocked embodiment of example V. That is, to improve the tear resistance, it is preferred that the amount of end-blocking be less than 100 percent, e.g. 95 percent or less.

What I claim is:

1. A curable fluid organic material suitable for use as a sealant, said material having an average molecular weight between about 200 and about 20,000, and having about 2 to about 8 functional groups per average molecular weight, selected from the group consisting of (a) 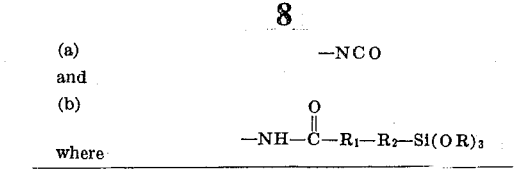
and
(b)
where R is a lower alkyl group,

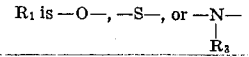

where $R_3$ is an alkyl, substituted alkyl, aryl, substituted aryl, or

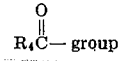

where $R_4$ is an alkyl, substituted alkyl, aryl, or substituted aryl group,
$R_2$ is an alkylene group having two to 18 carbon atoms,
$R$, $R_1$, $R_2$, $R_3$, and $R_4$ being free of active hydrogens,
at least 5 percent of the total of said (a) and (b) groups in said material being said group (b).

2. A material according to claim 1 wherein said curable fluid organic material is prepared from a reaction mixture comprising:
an —NCO terminated organic material having about 2 to about 8—NCO groups per average molecular weight and
a silane of the formula $HR_1$—$R_2$—$Si(OR)_3$, wherein R, $R_1$, and $R_2$ are as in claim 1 and H is an active hydrogen as determined by the Zerwitinoff Test,
said —NCO terminated organic material having been prepared from a reaction mixture comprising:
a compound containing at least two active hydrogen-bearing functional groups, as determined by the Zerwitinoff Test, and
an organic polyisocyanate,
the ratio of equivalents of said polyisocyanate to said active hydrogen-bearing compound ranging from 1.05:1 to 6:1.

3. A material according to claim 2 wherein the said ratio of equivalents ranges from 1.4:1 to 3:1.

4. A material according to claim 2 wherein said organic polyisocyanate is an aromatic diisocyanate and said active hydrogen-bearing compound is a polyalkyleneether glycol.

5. A material according to claim 2 wherein said silane is selected from the group consisting of an alkylaminoalkyltrialkoxysilane; a mercaptoalkyltrialkoxysilane; and $$CH_3\underset{\underset{O}{\|}}{C}-NH-R_2-Si(OR)_3$$

wherein R and $R_2$ are as defined in claim 2.

6. A material according to claim 1 wherein each R is a methyl group.

7. A sealant composition comprising a curable fluid organic material according to claim 1.

8. A sealant composition according to claim 7 wherein said composition contains a finely divided filler in an amount sufficient to form a thixotropic paste.

9. A sealant composition according to claim 8 wherein said filler comprises finely divided silica.

10. A sealant composition according to claim 1 wherein about 50 percent or less of said (a) and (b) groups in said material are said group (b).

11. A curable fluid —NCO—terminated polyurethane prepolymer suitable for use as a sealant, said prepolymer having an average molecular weight between about 200 and about 20,000, said prepolymer being prepared by:
1. forming an —NCO terminated material having about 2 to about 8 —NCO groups per average molecular weight, by reacting a compound containing at least two active hydrogen atoms as described by the Zerwitinoff Test with 1.4 to 6.0 equivalents, per equivalent of said compound, of an organic polyisocyanate, and 2. thereafter reacting said material with a silane of the formula $HR_1—R_2—Si(OR)_3$ wherein R, $R_1$, and $R_2$ are as in claim 1, the proportions of said silane being such that at least about 5 percent of the —NCO groups of said —NCO terminated material are reacted with said silane.

12. A glass substrate coated with the material of claim 1.

13. A composition curable to a tough, flexible product, said composition comprising:
 1 An —NCO terminated prepolymer having about 2 to about 8 —NCO groups per average molecular weight, said average molecular weight being between about 200 and about 20,000, said prepolymer having been derived from a reaction mixture comprising a compound having at least two active hydrogen-bearing groups, as determined by the Zerwitinoff test, and 1.05–6.0 equivalents, per equivalent of said active hydrogen bearing group, of an organic polyisocyanate;
 2 Up to about 50 percent by weight of filler, and
 3 Interacted with said prepolymer, at least about 0.7 weight percent and up to about 1.4 weight percent, based on the total of components (1)–(3), of a silane of the formula $HR_1—R_2—Si(OR)_3$, where
R is a lower alkyl group, $$R_1 \text{ is } —O—, —S—, \text{ or } —\underset{\underset{R_3}{|}}{N}—$$

where $R_3$ is an alkyl, substituted alkyl, aryl, substituted aryl, or $$\text{or } R_4\overset{\overset{O}{\|}}{C}— \text{ group}$$

where $R_4$ is an alkyl, substituted alkyl, aryl, or substituted aryl group,
$R_2$ is an alkylene group having two to 18 carbon atoms,
R, $R_1$, $R_2$, $R_3$, and $R_4$ being free of active hydrogens, and
H being an active hydrogen.

14. A glass substrate coated with the composition of claim 13.

15. A composition curable to a tough, flexible product, said composition comprising:
 1 500–996 parts by weight of an —NCO terminated prepolymer having about 2 to about 8 —NCO groups per average molecular weight, said average molecular weight being between about 200 and about 20,000, said prepolymer having been derived from a reaction mixture comprising a compound having at least two active hydrogen-bearing groups, as determined by the Zerwitinoff test, and 1.05–6.0 equivalents, per equivalent of said active hydrogen-bearing group, of an organic polyisocyanate;
 2 interacted therewith, 7–76.5 parts by weight of a silane of the formula $HR_1—R_2—Si(OR)_3$, where
R is a lower alkyl group, $$R_1 \text{ is } —O—, —S—, \text{ or } —\underset{\underset{R_3}{|}}{N}—$$

where $R_3$ is an alkyl, substituted alkyl, aryl, substituted aryl, or $$R_4\overset{\overset{O}{\|}}{C}— \text{ group}$$

where $R_4$ is an alkyl, substituted alkyl, aryl, or substituted aryl group,
$R_2$ is an alkylene group having two to 18 carbon atoms,
R, $R_1$, $R_2$, $R_3$, and $R_4$ being free of active hydrogens, and
H being an active hydrogen.

16. A glass substrate coated with the composition of claim 15.

17. A composition according to claim 15 wherein said composition contains up to 950 parts by weight of a filler.

* * * * *

UNITED STATES PATENT OFFICE
CERTIFICATE OF CORRECTION

Patent No. 3,627,722                 Dated December 14, 1971

Inventor(s) George M. Seiter

It is certified that error appears in the above-identified patent and that said Letters Patent are hereby corrected as shown below:

Column 1, line 75 (last line), "$HE_1$" in the formula should be -- $HR_1$ -- .

Column 2, line 23, after the formula "$HS(CH_2)_3Si(OC_2H_5)_3$" insert -- or -- at the end of the line and before the next formula.

Column 4, line 71, in the second Table in Example I, after "(OH No. 28.9)" insert -- (equiv. -- , so that the line will read
-- Polyoxypropylene Triol (OH No. 28.9) (equiv. wt. 1940)         194.0 -- .

Column 6, line 58, second Table in Example IV, "Dibutyl tin dilaurate" should be in small print and included as the last line in the Table.

Column 7, line 15, "relatively" should be -- relative -- ; line 42, delete the hyphen in the word "methylamino-propyltrimethoxysilane".

Column 9, line 34 (in Claim 13), second formula, delete the second "or", which is repetitious.

Signed and sealed this 20th day of February 1973.

(SEAL)
Attest:

EDWARD M.FLETCHER,JR.                ROBERT GOTTSCHALK
Attesting Officer                    Commissioner of Patents